Nov. 8, 1960 P. S. CARTER, JR 2,959,782
DIRECTION FINDING ANTENNA

Filed Nov. 14, 1958 2 Sheets-Sheet 1

INVENTOR.
PHILIP S. CARTER Jr.
BY
ATTORNEYS

INVENTOR.
PHILIP S. CARTER Jr.

United States Patent Office 2,959,782
Patented Nov. 8, 1960

2,959,782

DIRECTION FINDING ANTENNA

Philip S. Carter, Jr., Palo Alto, Calif., assignor, by mesne assignments, to the United States of America as represented by the Secretary of the Air Force Filed Nov. 14, 1958, Ser. No. 774,069

2 Claims. (Cl. 343—708)

This invention relates to high frequency radiant energy systems, and particularly to airborne dual loop antenna structure for use in such systems.

An object of the invention is to provide a dual loop antenna whose structure tends to achieve maximum isolation from the intense resonant current of the fuselage of the craft carrying the antenna, and at the same time also achieves physical and electrical balance with respect to the magnetic neutral of the wing currents.

Up to the present time, the problem of finding the correct bearings of waves arriving from the ionosphere has not been considered in connection with airborne direction finding. The direction finders now in use on aircraft operate in the low-frequency range where there is always a strong vertically-polarized ground wave present and where the wave arriving from the ionosphere is negligible. At higher frequencies and at distances exceeding 200 miles, there is a negligible component of field due to the ground wave. Any direction finder designed for use in determining bearings at distances beyond 200 miles must be able to determine the bearing of sky waves.

Techniques for accomplishing sky-wave direction finding are available and consist of antenna arrays which respond to a single polarization of the incident field. The two simplest antennas which meet this requirement are the electric and magnetic quadrupoles. The electric quadrupole is more familiarly known as the Adcock antenna and is widely employed in ground station direction-finding installations. The magnetic quadrupole takes the form of spaced, opposed loops and is not generally employed because of its low sensitivity. The operation of both of these antennas depends on the detection of the constant phase front which is perpendicular to the direction of arrival of the wave and not upon the orientation of a particular component of the field.

It is wothwhile to examine some of the pactical difficulties in connection with the employment of an Adcock direction finder in an airborne installation. The problems connected with the design of an Adcock type installation are (1) to obtain a sufficiently large signal-to-noise ratio to successfully operate a direction-finding receiver, and (2) to design an Adcock antenna which is sufficiently well balanced electrically so that it will give the prescribed sine radiation patterns.

The present invention provides an antenna structure meeting the two problems referred to, the antenna being characterized by the provision of upper and lower loops whose feed terminals are connected in such manner that the induced voltages due to the impinging magnetic field ($H_o$) of wing current origin will be additive while the induced voltages due to the scattered fields ($H_s$) of airframe contour origin will be subtractive and, in actual operation, will tend to be mutually cancellative.

Other characteristics and objects of the invention will be apparent upon examination of the following detailed description of the embodiment of the invention illustrated in the accompanying drawings wherein.

Figure 1:
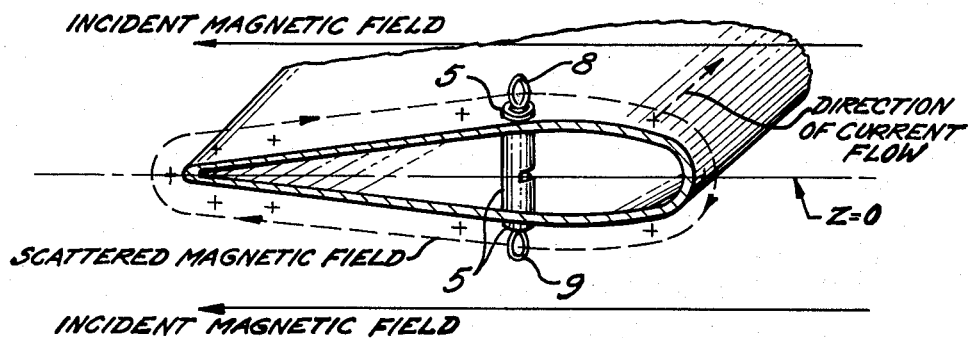
Fig. 1 is a sectional view of an antenna embodying the invention.
Figure 2:
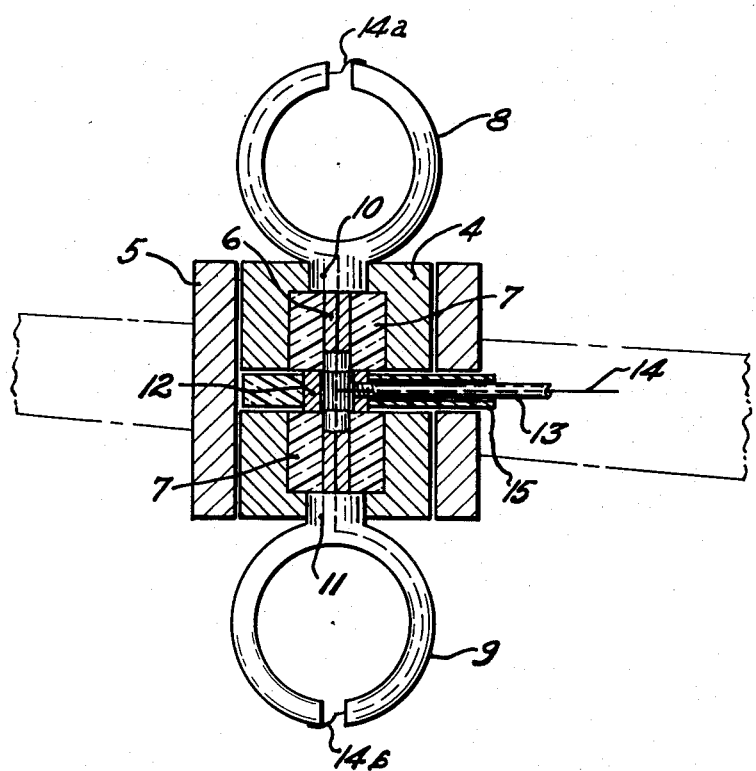
Fig. 2 shows the antenna and aerofoil section (e.g., a conventional wing structure) in combination.

As shown, the antenna structure includes a solenoid-like assembly comprising a cylindrical outer shell 4 of electrically conductive material, rotatable within transversely slotted bearing housing 5, a central spindle 6 of electrically conductive material, a pair of interposed bushings 7 of dielectric material, a pair of looped antenna elements 8, 9 having shank portions 10, 11, respectively, for mechanical union with the opposite ends of the spindle 6, a transversely extending collar 12 for rotation with the spindle 6, an actuating link 13 (which passes through an insulatory spacer 15 and tapped into said collar 12), constituting the transmission element for angularly orienting the loop assembly by remote control, and a current conducting wire or cable 14 extending through link 13, collar 12, spindle 6, and loops 8 and 9, where it has its terminal ends 14a and 14b, to electrically connect said loops with the tuning network (not shown).

In an actual, successfully conducted trial test on a 1/43 size scale model aircraft, the torque-transmitting central spindle was made of one-eighth inch brass rod and the driving bushing consisted of a flat washer of dielectric material, one-eighth of an inch in thickness. A vertically polarized horizontally-traveling wave was used to excite the antenna and airframe. In order to determine the effect of the intense excitation of the horizontal wing structure caused by a horizontally-polarized electromagnetic field, the airframe was also excited with a horizontally-polarized horizontally-traveling wave. This was performed for bearings 0°, 90°, and 180°. For a horizontally-traveling horizontally-polarized wave there is no excitation of the loop due to the incident field. The only magnetic field present which is detectable by the direction finder is, then, the scattered field. No appreciable excitation of the direction-finding antenna was noticed at any of the frequencies used throughout the experiment, and therefore the results of this experiment are not recorded in this report.

Since the balanced wing-loop is not located at the airframe plane of symmetry, the direction finder patterns are not mirror images of each other for bearings equally displaced to either side of the position $\phi = 0°$. In this case, it is necessary to record the patterns as a function of bearing throughout the entire azimuth.

A disadvantage in experimental procedure is evident for an asymmetric installation such as this. There is no single position in which the bearing deviation should be zero, and therefore there is no way of checking the uniformity of airframe illumination or the presence of pattern range site reflection (Appendix B). However the instrumentation, pattern range site, etc., were the same as those used for the nose loop investigation, during which no anomalies were encountered.

Figure 3:
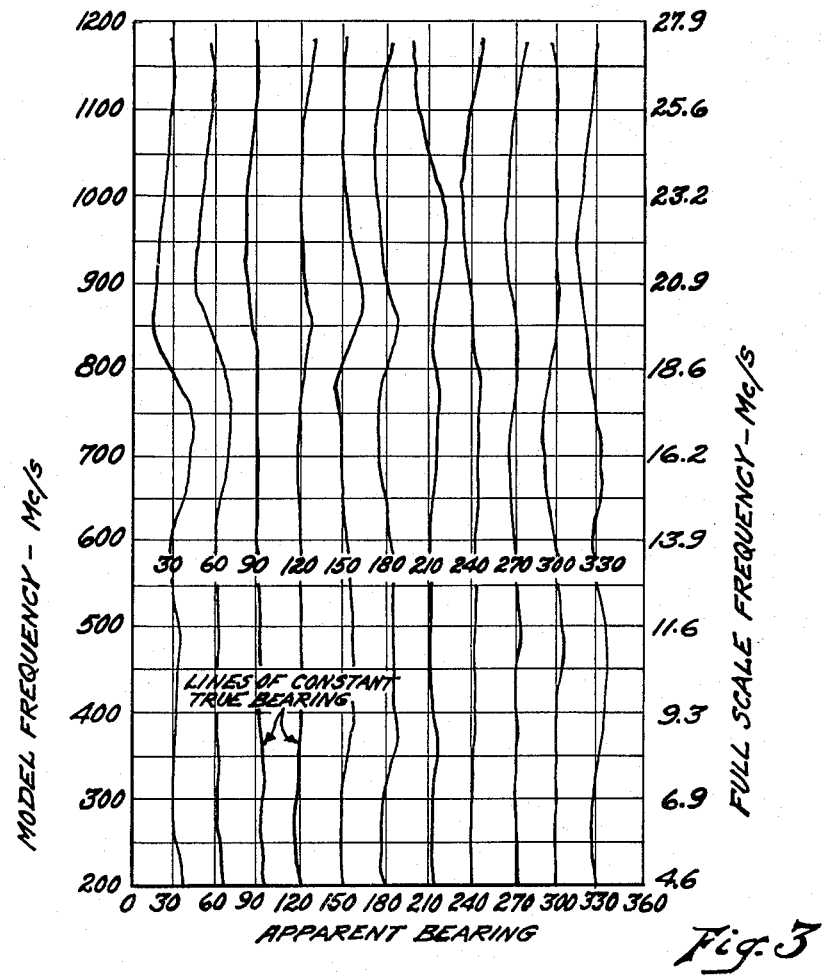
Figs. 3 and 4 show performance data in graphic form.

The bearing deviation data derived from the balanced wing loop patterns are presented in Fig. 3. The improvement in direction finding behavior over the nose installation is immediately evident. The maximum bearing deviation at frequencies below 14 mc./s. is 6° or less at all aircraft headings. At frequencies above 14 mc./s. the bearing behavior deteriorates, with deviations as large as 15° evident. At all frequencies and aircraft headings the indicated bearings are unique (no ambiguities) and the direction-finder characteristic may be mechanically compensated for each frequency.

The bearing deviations shown in Fig. 3 are small enough so that "resonant" behavior as in the case of the nose loop is hardly evident. Only in the frequency range of 14 to 19 mc./s. is any resonant behavior at all evident, possibly an effect of the same nature as in the range of 14 to 17 mc./s. for the nose loop.

Figure 4:
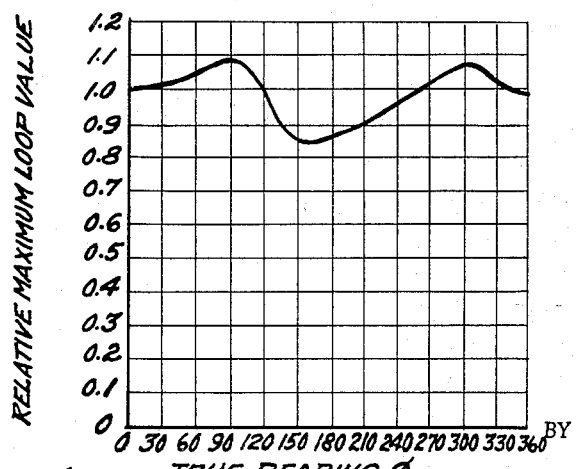

A further qualitative indication of the amount of decoupling from wing current, that is obtained with the balanced loop, is given in Fig. 4. This figure shows the relative maximum loop signal level as a function of the bearing of the aircraft with respect to the source. The curve given for a frequency of 11.3 mc./s. is fairly typical of the data obtained at all the experimental frequencies. The almost constant loop signal level is fairly good assurance that the loop signal is practically entirely due to the incident field, $H_o$.

What is claimed is:

1. An antenna assembly for mounting on an airfoil section comprising an outer cylindrical shell of electrically conductive material, said shell being transversely slotted intermediate its ends, a spindle extending along the longitudinal axis of said shell, said spindle having terminals in the form of pairs of arcuate tubes, each pair having the same radius of curvature, with the tubes of each pair terminating in spaced relationship, to establish axially aligned air gaps within the region of the magnetic field embracing said airfoil section, said arcuate tubes being disposed adjacent the opposite outer surfaces of said airfoil section, actuating means movable in said transversely slotted portion of said shell to apply turning effort to said arcuate tubes by way of said spindle, and current conducting means extending through said actuating means and spindle and through one tube only of each pair of arcuate tubes, to terminate on the respective tubular surfaces of the other tubes of the respective pairs of tubes, which other tubes thus serve as the return current paths of the communication system.

2. The assembly defined in claim 1, including dielectric bushings interposed between said shell and spindle, said bushings being spaced on either side, axially, of said actuating means.

References Cited in the file of this patent

UNITED STATES PATENTS

| | | |
|---|---|---|
| 1,373,612 | Hanson | Apr. 5, 1921 |
| 1,679,095 | Pickard | July 31, 1928 |
| 2,095,588 | Bellini | Oct. 12, 1937 |
| 2,192,321 | Meir | Mar. 5, 1940 |
| 2,217,989 | Morgan | Oct. 15, 1940 |

FOREIGN PATENTS

| | | |
|---|---|---|
| 1,065,736 | France | Jan. 13, 1954 |